United States Patent Office.

EDWARD DE LA GRANJA, OF BOSTON, MASSACHUSETTS, ASSIGNOR TO HIMSELF AND HERMAN SUSMANN, OF THE SAME PLACE.

Letters Patent No. 68,850, dated September 17, 1867.

IMPROVED MODE OF PRESERVING MEATS, &c.

The Schedule referred to in these Letters Patent and making part of the same.

TO ALL WHOM IT MAY CONCERN:

Be it known that I, EDWARD DE LA GRANJA, of Boston, in the county of Suffolk, and State of Massachusetts, have invented a new and useful Improvement in Preserving Meats, Game, &c.; and I do hereby declare the following to be a full, clear, and exact description of the same, sufficient to enable one skilled in the art to make use of it.

In this invention the meat, &c., is preserved by means of a solution of spices injected into the arteries of the meat, in combination with an impermeable covering applied upon the outside of the meat. My invention is designed for the preservation of all kinds of meat, game, poultry, &c., used for human food, and when my process is properly followed it will preserve such meats, &c., in a perfectly sweet and edible condition with but a trifling expense.

First, I drain off all the blood of the animal by incising both ventricles. I then supply the place of the blood by injecting into the arterial system through the aorta, by means of a stop-cock pipe, a solution of red sweet pimento and strong wine or other vinegar, the whole being dissolved in water purified by boiling, distilling, or filtering, and flavored with orange peel and laurel leaves. The solution thus injected is to be varied in strength and proportions of ingredients according to the climate where the meat is to be preserved or consumed. The proportions cannot be fixed definitely on account of the great variety of climates and temperatures. In general, however, the proportions will be about one pound of red sweet pimento to one pint wine, one gallon purified water, one ounce orange peel, half ounce laurel leaves. The proportions may vary very greatly in different localities by reason of the causes above referred to. It is not absolutely necessary that this solution should be applied to the meat by injection as above described, but it may be applied by soaking the meat in it, as in a pickle, to saturation. The method of injection I prefer, however, as being on the whole the best. The meat having been thus saturated with the solution above described, I complete the process by covering it with an impermeable covering spread directly upon the surface of the meat, without the intervention of cloths or any other means of retaining it in connection with the meat. For this purpose I use beeswax, spermaceti, or paraffine, either singly or in combination in any desired proportions, applied while sufficiently hot, according to the climate. The weight of the meat may first be reduced by evaporation if deemed advisable.

Having thus described my invention, what I claim as new, and desire to secure by Letters Patent, is—

The process of preserving meats by applying the injection or saturating mixture above described, in combination with the impermeable covering, substantially as and for the purpose set forth.

To the above specification of my improvement I have signed my hand this 20th day of June, 1867.

E. DE LA GRANJA.

Witnesses:
SOLON C. KEMON,
NATHAN K. ELLSWORTH.